US012468901B1

(12) United States Patent
Ahmad et al.

(10) Patent No.: US 12,468,901 B1
(45) Date of Patent: Nov. 11, 2025

(54) SYSTEMS AND METHODS TO GENERATE NOTES BASED ON CONTEXTUAL CONTENT IN MULTIPLE MODES

(71) Applicant: Suki AI, Inc., Redwood City, CA (US)

(72) Inventors: Feroz Ahmad, Sunnyvale, CA (US); Siddharth Sharma, Gurugram (IN); Belwadi Srikanth, Santa Clara, CA (US); Jagruti Joshi, Ahmedabad (IN)

(73) Assignee: Suki AI, Inc., Redwood City, CA (US)

( * ) Notice: Subject to any disclaimer, the term of this patent is extended or adjusted under 35 U.S.C. 154(b) by 152 days.

(21) Appl. No.: 18/532,409

(22) Filed: Dec. 7, 2023

(51) Int. Cl.
*G06F 40/40* (2020.01)
*G16H 10/60* (2018.01)
*G16H 15/00* (2018.01)

(52) U.S. Cl.
CPC ............. *G06F 40/40* (2020.01); *G16H 10/60* (2018.01); *G16H 15/00* (2018.01)

(58) Field of Classification Search
None
See application file for complete search history.

(56) References Cited

U.S. PATENT DOCUMENTS

| | | | | |
|---|---|---|---|---|
| 8,612,261 | B1* | 12/2013 | Swanson | G16H 40/67 705/3 |
| 2008/0103833 | A1* | 5/2008 | Miglietta | G16H 50/20 705/3 |
| 2014/0358585 | A1* | 12/2014 | Reiner | G06F 16/219 705/3 |
| 2018/0174043 | A1* | 6/2018 | Po | G16H 50/50 |
| 2018/0308565 | A1* | 10/2018 | Pinter | G06N 20/00 |
| 2020/0303048 | A1* | 9/2020 | Petri | G06F 40/186 |

OTHER PUBLICATIONS

Junnan Li, et al., "BLIP-2: Bootstrapping Language-Image Pre-training with Frozen Image Encoders and Large Language Models"; Jun. 15, 2023; (13 pages).
Wenliang Dai, et al., "InstructBLIP: Towards General-purpose Vision-Language Models with Instruction Tuning"; Jun. 15, 2023; (17 pages).

* cited by examiner

*Primary Examiner* — Peter Vincent Agustin
(74) *Attorney, Agent, or Firm* — Esplin & Associates, PC

(57) ABSTRACT

Systems and methods to generate notes based on contextual content are disclosed. Exemplary implementations may: obtain audio information that represents sounds captured by a client computing platform, wherein the sounds convey utterances by participants during a conversation session, wherein the participants include at least the first caregiver and the first subject in the first setting; generate a prompt that requests generation of textualized content blocks for inclusion in one or more sections of a note; provide the audio information, first caregiver contextual content for the first caregiver, first subject contextual content for the first subject, and first setting contextual content for the first setting to a context window of a large language model; provide the prompt to the large language model; receive, from the large language model, the textualized content blocks; and populate the textualized content blocks in the note.

20 Claims, 3 Drawing Sheets

SYSTEMS AND METHODS TO GENERATE NOTES BASED ON CONTEXTUAL CONTENT IN MULTIPLE MODES

FIELD OF THE DISCLOSURE

The present disclosure relates to systems and methods to generate notes based on contextual content in multiple modes.

BACKGROUND

While traditional note taking by caregivers often relies solely on verbal communication between the caregiver and the patient, the notetaking may be further based on information from other sources that are in varying modes. The modes may include in an image, a video, written text, input text via an electronic device.

SUMMARY

One aspect of the present disclosure relates to a system configured to generate notes based on contextual content in multiple modes. During a visit between a caregiver and a subject, a note that documents the visit may be based on audio information that conveys utterances during a conversation session between the caregiver, the subject, and/or other participants. In addition to the conversation session, the subject may provide additional content that is relevant to the visit to provide context, i.e., subject contextual content. The caregiver may additionally provide additional content that is relevant to care they can provide regarding the visit, i.e., caregiver contextual content. Lastly, content regarding a setting of the visit and/or a setting of the subject that is relevant to the visit (e.g., setting of a symptom) may be provided as further context, i.e., setting contextual content. The subject contextual content, the caregiver contextual content, and the setting contextual content may be in different modes including but not limited to images, videos, audio, manual input, and/or other modes. The subject contextual content, the caregiver contextual content, the setting contextual content, the audio information, and a prompt that requests generation of content blocks may be provided to a machine learning model that is configured to obtain and analyze input, and subsequently output content blocks that summarize the input in an organized manner. The content blocks may then be populated in a note that documents the visit.

Thus, the system efficiently analyzes and generates appropriate content blocks for a given note based on a plurality of information that are in various modes. Such functionality is an improvement to existing systems that merely combine the contextual content in the various modes into one file or folder, but fail to utilize the contextual content in the various modes to ultimately generate the given note that is a collective summary of a given visit and/or care that may be recommended.

The system may include electronic storage, one or more hardware processors configured by machine-readable instructions, and/or other elements. The machine-readable instructions may include one or more instruction components. The instruction components may include computer program components. The instruction components may include one or more of information obtaining component, prompt generating component, model utilizing component, note populating component, and/or other instruction components.

The electronic storage may store contextual content, and/or other information. The contextual content may include caregiver contextual content for individual caregivers, subject contextual content for individual subjects, setting contextual content for individual settings, and/or other contextual content. By way of non-limiting example, the contextual content may include first caregiver contextual content for a first caregiver, first subject contextual content for a first subject, and first setting contextual content for a first setting.

The information obtaining component may be configured to obtain audio information that represents sounds captured by a client computing platform. The sounds convey utterances by participants during a conversation session. The participants may include at least the first caregiver and the first subject in the first setting.

The prompt generating component may be configured to generate a prompt that requests generation of textualized content blocks for inclusion in one or more sections of a note. The textualized content blocks may include textualized statements of information about the subject.

The model utilizing component may be configured to provide the audio information, the first caregiver contextual content, the first subject contextual content, and the first setting contextual content to a context window of a large language model. The model utilizing component may be configured to provide the prompt to the large language model. The model utilizing component may be configured to receive, from the large language model, the textualized content blocks and/or other content.

The note populating component may be configured to populate the textualized content blocks in the note.

As used herein, the term "obtain" (and derivatives thereof) may include active and/or passive retrieval, determination, derivation, transfer, upload, download, submission, and/or exchange of information, and/or any combination thereof. As used herein, the term "effectuate" (and derivatives thereof) may include active and/or passive causation of any effect, both local and remote. As used herein, the term "determine" (and derivatives thereof) may include measure, calculate, compute, estimate, approximate, generate, and/or otherwise derive, and/or any combination thereof.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

DETAILED DESCRIPTION

Figure 1:
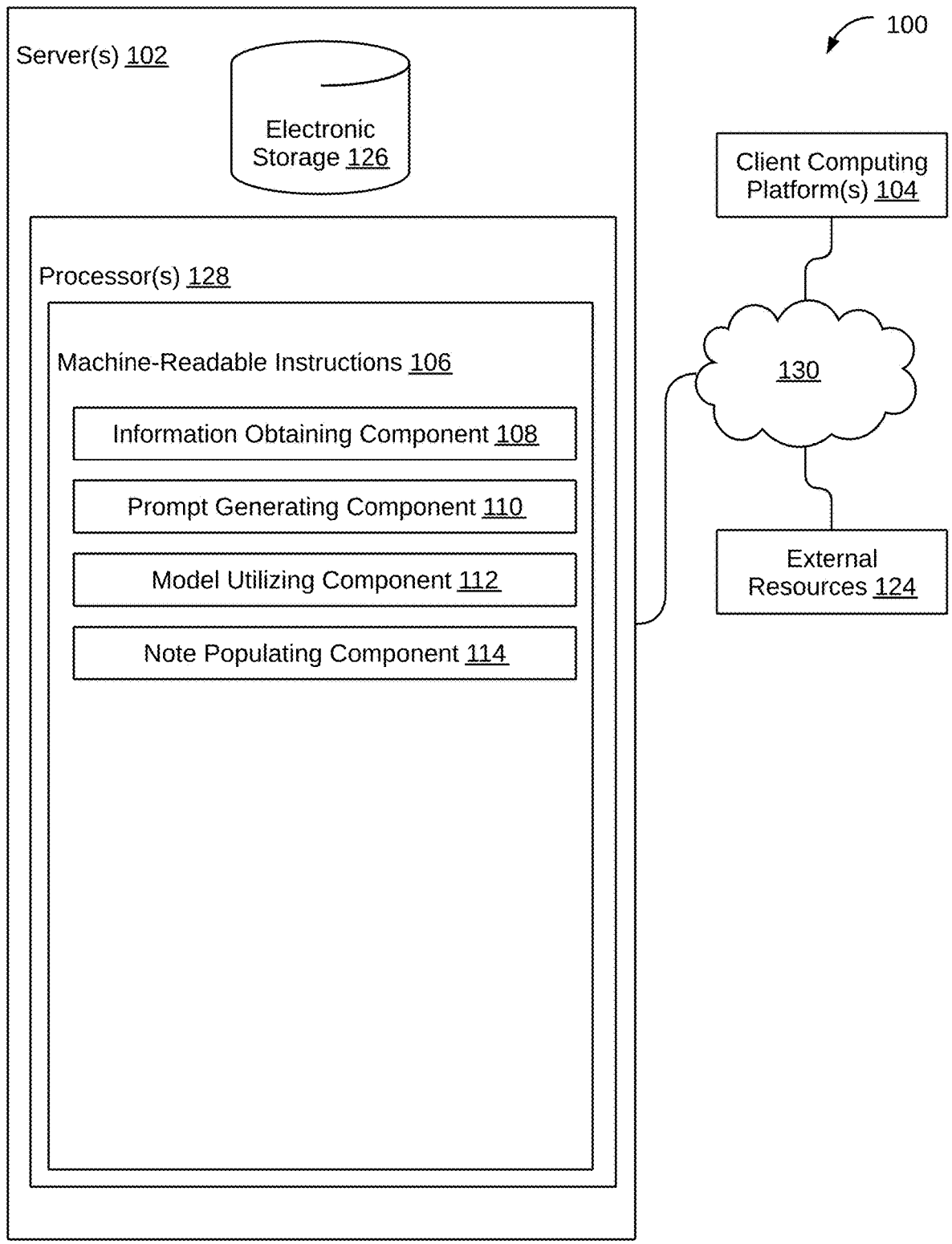
FIG. 1 illustrates a system configured to generate notes based on contextual content in multiple modes, in accordance with one or more implementations.

FIG. 1 illustrates a system 100 configured to generate notes based on contextual content in multiple modes, in accordance with one or more implementations. In some implementations, system 100 may include one or more servers 102. Server(s) 102 may be configured to communicate with one or more client computing platforms 104 according to a client/server architecture and/or other architectures. Client computing platform(s) 104 may be configured to communicate with other client computing platforms via server(s) 102 and/or according to a peer-to-peer architecture and/or other architectures. Users may access system 100 via client computing platform(s) 104.

Server(s) 102 may include electronic storage 126 and be configured by machine-readable instructions 106. Electronic storage 126 may store contextual content, and/or other information. The contextual content may include caregiver contextual content for individual caregivers, subject contextual content for individual subjects, setting contextual content for individual settings, and/or other contextual information. The contextual content may provide an understanding of the individual subjects, the individual caregivers, the individual settings, and/or other entities to enable provision of efficient care and documentation of the care, for the subject by the caregiver, in the note. The contextual content may include information that are in various modes to establish backgrounds amongst the caregivers, the subjects, and/or other participants. In some implementations, by way of non-limiting example, the modes of the contextual content may include one or more of an image, a digital document, a video, supplemental audio information, written text, input text, generated text, and/or other modes.

By way of non-limiting example, the image may be a copy of a given physical document, a photo of the given physical document, a photo of a visible and physical symptom (e.g., a rash), and/or other images in a various image formats (e.g., .JPG, .tiff, .JPEG). In some implementations, the digital document may be a document created with computer applications (e.g., portable document format (PDF)). In some implementations, the video may include a visual overview of multiple physical documents, a video of the visible and physical symptom, and/or other videos that visualize other content in various video formats (e.g., .mov, .mp4, .avi). The supplemental audio information may represent sounds that convey a recitation of information related to or about a given entity such as the individual subjects, the individual caregivers, the individual settings, and/or other information. The supplemental audio information may be captured by client computing platform 104 associated with the individual caregivers, the individual subjects, and/or others individuals. For example, the supplemental audio information may be a dictated description of the symptom. The written text may be written by the individual subjects or the individual caregivers, such as on a physical form that is to be filled out. In some implementations, the written text may be digitally provided via user interface elements (e.g., via a Smart device and a stylus) or may be conveyed as one of the images or as one of the digital documents (i.e., a physical form filled out and scanned into the image or the digital document). The input text may be manually input via user interfaces of client computing platforms 104 associated with the caregivers or the subjects.

Individual ones of the user interfaces may include a keyboard, the stylus, a mouse, a touchscreen, user interface elements presented on the touchscreen, and/or other user interface elements. The user interface elements may be configured to facilitate user interaction with the user interface, user entry, and/or selection. An individual user interface element may be configured to be selected by or manipulated by the users to provide information. By way of non-limiting illustration, the user interface elements may include one or more of text input fields, drop down menus, check boxes, display windows, virtual buttons, and/or other user interface elements.

The caregiver contextual content for individual caregivers may provide a background of qualifications for the individual caregivers. The caregiver contextual content for individual caregivers may include content indicating an academic transcript, content indicating an accolade list, content indicating training and work experience, content indicating one or more certifications, and/or other caregiver contextual content. By way of non-limiting example, the caregiver contextual content for the individual caregivers may include an image of an academic transcript, a video of an academic transcript, an image one or more letters of recommendations, a video one or more letters of recommendations, an image of an accolade list, a written accolade list that conveys the accolade list, an input of the accolade list, a dictation of the accolade list, an image of training and work experience, written training and work experience that conveys the training and work experience, an input of the training and work experience, a dictation of the training and work experience, and/or other caregiver contextual content.

The subject contextual content for individual subjects may convey one or more focuses, a background, and/or other information about the individual subjects. The subject contextual content for individual subjects may include content indicating symptoms, a vaccination record, a medication list, a subject history, body measurement information, and/or other subject contextual content. By way of non-limiting example, the subject contextual content for individual subjects may include an image of a symptom that is visible, a video of the symptom that is visible and/or audible, supplemental audio information for the symptom that is audible, a written description of the symptom, an input description of the symptom, a dictation that describes the symptom, an image or video of a vaccination record, a written vaccination record that conveys the vaccination record, an input of the vaccination record, a dictation of the vaccination record, an image or video of a medication list, a written medication list that conveys the medication list, an input of the medication list, a dictation of the medication list, an image of a subject history, a video of the subject history, a written description of the subject history, an input description of the subject history, a dictation that describes the subject history, current body measurement information that is input subsequent to measurement, and/or other subject contextual content.

The medication list may include prescriptions, over-the-counter medications, and/or other medications. The subject history may include past occurrences of one or more symptoms and/or familial history of the one or more symptoms. The body measurement information may include blood pressure, body temperature, weight, height, heart rate, blood oxygen saturation, and/or other body measurement information.

The setting contextual content for individual settings may specify the settings of the subjects, the caregivers, visits between the caregivers and the subjects, past settings of the subjects, and/or other settings. The setting contextual content for individual settings may include content indicating physical locations of the subjects, physical locations of the caregivers, accessible resources at medical facilities, environmental conditions at the physical locations of the subjects and/or the caregivers, outbreaks, exposures to illnesses, and/or other setting contextual content. By way of non-limiting example, the setting contextual content for individual settings may include an image conveying location information that specifies the physical locations of the subjects and the caregivers, a database indicating devices and/or machines accessible at medical facilities within a proximity of the physical location, the environmental conditions at the physical location via a communication with external resources 124, outbreak information based on the physical location via the communication with external resources 124, exposure information at the physical location and/or past physical locations of the subjects via the communication with external resources 124, and/or other setting contextual content. In some implementations, the location information may include one or more of a street, city, state, province, country, global positioning system coordinates, and/or other location information. In some implementations, the physical location of the first subject and of the caregiver may be a medical facility. Thus, in some implementations, the setting contextual content may include devices, machines, and/or medications accessible at the medical facility. The environmental conditions may include a pollen level, a mold level, a dust and dander level, an air quality level, humidity, outdoor temperature, indoor temperature, and/or other environmental conditions. By way of non-limiting example, the contextual content may include first caregiver contextual content for a first caregiver, first subject contextual content for a first subject, and first setting contextual content for a first setting.

Machine-readable instructions 106 may include one or more instruction components. The instruction components may include computer program components. The instruction components may include one or more of information obtaining component 108, prompt generating component 110, model utilizing component 112, note populating component 114, and/or other instruction components.

Information obtaining component 108 may be configured to obtain audio information that represents sounds captured by client computing platform 104. By way of non-limiting example, client computing platform 104 may be associated with the caregiver. The sounds may convey utterances by participants during a conversation session. The participants may include at least the first caregiver and the first subject in the first setting. In some implementations, the audio information may include digital audio signals that encode sounds of individual utterances of the participants, a recording of the individual utterances of the participants, and/or other audio information. In some implementations, the sounds of the utterances of the user may be detected by an audio input device, such as a microphone, of client computing platform 104. In some implementations, the sounds may be converted to the digital audio signals by converting analog waves to the digital audio signals by precisely measuring the analog waves at consistent and frequent intervals. The recording of the individual utterances may include a digital file of a reproduction of the digital audio signals that cause the sounds, and thus convey the utterances, the digital audio signals, and/or other recording. In some implementations, information obtaining component 108 may be configured to generate the audio information based on the sounds in response to silence that follows utterances and/or user input via the user interface elements (e.g., selecting a virtual button). In some implementations, the silence may be for a particular amount of time that may be fixed or modifiable by particular users (e.g., an administrative user, the caregivers).

In some implementations, the first setting of the subject may be a physical location that is different than a physical location of the caregiver such that the audio information obtained represents a voice and/or video call between the participants. In some implementations, information obtaining component 108 may be configured to obtain the contextual content via a network 130 from client computing platforms 104 associated with the subjects and/or client computing platforms 104 associated with the caregivers. By way of non-limiting example, the first subject may E-mail, upload via a subject interface, or otherwise transmit an image of their vaccination card.

Information obtaining component 108 may be configured to perform, upon obtainment of the audio information, speech recognition on the individual audio information to generate a transcript of the conversation session. The speech recognition performed may be known and/or novel techniques.

Prompt generating component 110 may be configured to generate a prompt that requests generation of textualized content blocks for inclusion in one or more sections of a note. The textualized content blocks may include textualized statements of information about the first subject that summarize information regarding various topics and the first subject. In some implementations, the prompt may request generation of content blocks that include text, images, videos, links to videos, and/or other content that summarize the information regarding the various topics and the first subject.

Model utilizing component 112 may be configured to provide the transcript, the audio information, the first caregiver contextual content, the first subject contextual content, the first setting contextual content, and/or other information to a context window of a machine learning model. The context window may be an interface where information that facilitates generation of the textualized content blocks and/or the content blocks may be input. For example, inputting such information may include uploading, transmitting via network 130, and/or other input techniques. Model utilizing component 112 may be configured to provide the prompt to the machine learning model.

In some implementations, semantic understanding of the audio information, the caregiver contextual content, the subject contextual content, and the setting contextual content, and/or other contextual content may be performed by external resources 124. The semantic understanding of content may refer to determining a meaning and context of information conveyed in the contextual content and/or the audio information. Such external resources 124 that perform the semantic understanding may include one or more vision language models that are configured to process and summarize the contextual content in visual modes (such as images, digital documents, and videos) into the generated text. That is, the generated text may be a summary of the information indicated in the contextual content that are in the visual modes. For example, an image, a video, and/or a digital document that presents information about a subject may be transformed into the generated text that summarizes such information.

In some implementations, the vision language models may be knowledge domain specific (e.g., medical knowledge domain). That is, for example, a given vision language model may be configured to semantically understand contextual content that is specific to the medical field. For example, an image of a skin rash may be input to the given vision language model and the given vision language model may output a summary of the skin rash. In some implementations, the summary may include a description of how the skin rash looks.

In some implementations, one or more of the vision language models may be configured to generate a hypothesized diagnosis, a proposed treatment for the hypothesized diagnosis, a probable cause of the hypothesized diagnosis, and/or other information, which may be included in the summary.

The contextual content that are videos (i.e., the mode) may include multiple frames that sequentially comprise individual videos. One or more of the multiple frames may include key frames. The key frames may be images that individually indicate information about the subjects, the caregivers, the setting, and/or other information that may be utilized in note generation. The one or more vision language models may be configured to identify the key frames from the videos and subsequently perform or effectuate performance of the semantic understanding of the image, and thus generate the summary.

As such, the contextual content and/or other information in the mode of the generated text (i.e., the summary generated via the semantic understanding based on the contextual content in the visual modes) may be provided to the context window of the machine learning model in addition to the contextual content in its original modes (e.g., the images, the videos, the digital documents). In some implementations, such external resources 124 that perform the semantic understanding may be stored in cloud storage accessible via network 130, electronic storage 126, and/or other electronic storage. In some implementations, the generated text resultant from the semantic understanding may be stored in cloud storage accessible via network 130, electronic storage 126, and/or other electronic storage.

In some implementations, the machine learning model may be stored in electronic storage 126, the cloud storage, and/or other storage. In some implementations, the machine learning model may be stored and executed by external resources 124. For example, the machine learning model may be a third party service employed by system 100. In some implementations, the machine learning model may perform novel and/or known optical character recognition techniques on the contextual content that are the images, the videos, the written text, and/or audio information.

In some implementations, the machine learning model may have access to or be in communication with the cloud storage, electronic storage 126, and/or external resources 124 (e.g., via network 130) that provide or include at least some of the contextual content. In some implementations, the machine learning model may be a custom Encoder-Decoder based Transformer model that may be used to receive audio information, text, images, and/or videos as input to the Encoder. The Encoder may generate high-dimensional representations of the input audio information, text, images, and/or videos which is utilized by the Decoder to generate appropriate textualized content blocks and/or the content blocks.

In some implementations, the machine learning model may include an image encoder, a Query Transformer, a large language model, and/or other components. The Query Transformer may be trained based on (i) image embeddings for image input from the image encoder, (ii) instructions, and (iii) model parameters including learnable query embeddings and/or other model parameters. The image input may include the images, the key frames of the videos, the digital documents, and/or other contextual content in the visual modes. The image embeddings may include numerical representations of the image input. The instructions may request particular output in relation to the image input that are represented by the image embeddings. In some implementations, the instructions may be based on the generated text (i.e., the summaries of the images, the key frames of the videos, the digital documents, and/or other contextual content in the visual modes) which are descriptions of the image input and associated with the image embeddings. For example, the particular output requested via the instructions may be a summarization of the image input, an inference based on the image input, a recognition of details in the image input, among others. Through cross-attention, the image embeddings may interact with the query embeddings to enable extraction of the visual features that are relevant to the instructions. The visual features may include, but are not limited to text (e.g., lab results), color, texture, imperfections (e.g., bone fracture, a mass, blemished skin), and/or other visual features that are visible amongst the image input. Through self-attention, the query embeddings may interact with the instructions to enable extraction of the visual features that are relevant to the instructions. As a result, the Q-Transformer may output encoded visual vectors. The visual vectors in addition to the instructions may subsequently be provided to the large language model so that the large language model is tuned based on the instructions and the visual vectors.

The large language model may be configured to summarize the visual features extracted from individual ones of the images, the key frames of individual ones of the videos, and/or individual ones of the digital documents. The large language model may be further configured to associate the visual features with keywords. The keywords may be singular or short-phrased terms that characterize the visual features that were extracted from the images.

In some implementations, the large language model may be Transformer-based which has been previously trained on a plurality of generic information to generate output text (i.e., the textualized content blocks) based on the information received. The large language model may be Encoder-Decoder based with a plurality of model parameters where the large language model is trained on a variety of language tasks. The large language model may utilize both the Encoder and Decoder components of the architecture during training. The Decoder may only be used for generating the output text. In some implementations, the large language model may be fine-tuned on specific training information or open-source clinical information, which may improve the quality of the generated textualized content blocks and/or the content blocks described herein.

In some implementations, the large language model may be Decoder based only. The large language model may include a generative pre-trained Transformer that generates the output text without being trained with specific knowledge domain information while being able to execute knowledge domain-specific tasks. The Transformer of the large language model may employ multi-head attention to determine a probability of a subsequent word appearing given other surrounding words. The large language model may be trained based on a plurality of the model parameters so that automation of textualized content blocks is optimized.

In some implementations, such large language model may be fine-tuned by utilizing a supervised dataset. The supervised dataset may include input prompts provided by users via user input, responses generated by the large language model as text output based on the input prompts, and appropriate responses provided by the users based on the input prompts. Fine-tuning the large language model based on the supervised dataset may enable the large language model to generate more accurate text outputs. Subsequently, the fine-tuned large language model may be provided with a sample prompt to obtain sample outputs for the purpose of fine-tuning. Best to worst rankings of the sample outputs, given the sample prompt, may be received from the users. Such rankings may be subsequently utilized to train a reward model. The reward model may be used to further train the fine-tuned large language model, thus improving quality of the text outputs (i.e., the textualized content blocks) output by the fine-tuned large language model.

Thus, subsequent to training, the machine learning model may be configured to obtain the contextual content as a given image input in addition to the transcript, the audio information, and/or other information and generate textualized content blocks and/or content blocks as output based on at least the prompt, the visual features of the contextual content, the transcript, the audio information, and/or other information.

Model utilizing component 112 may be configured to receive, from the machine learning model, the textualized content blocks. In some implementations, model utilizing component 112 may be configured to the content blocks from the machine learning model. The textualized content blocks and/or the content blocks may be transmitted and thus obtained via network 130 that the machine learning model and server(s) 102 are connected through. In some implementations, obtainment of the textualized content blocks and/or the content blocks may be within server(s) 102 upon the machine learning model being stored in electronic storage 126. In some implementations, model utilizing component 112 may be configured to establish the connection with the machine learning model via the network 130.

In some implementations, note populating component 114 may be configured to receive, via client computing platform 104, a selection of a note type from note types stored in electronic storage 126. The note types may be a basis for generating a note.

Individual ones of the note types may include different combinations of one or more sections and/or one or more parameter classes. Individual ones of the note types may include one or more note sections. By way of non-limiting example, the note sections may include synopsis of the subject, prescriptions, illnesses and conditions, symptoms, diagnoses, and/or other note sections. In some implementations, a note type may be customized by a user to include particular ones of the note sections and/or new note sections.

A parameter class may cause population of a corresponding parameter and placeholder in a given note upon selection of one of the note types that includes the parameter class. A parameter may be a measurable, recordable, and/or determined information. The placeholder may be a space or symbol in place of a parameter value that defines the parameter with regard to the subject. The parameter value corresponding to the parameter may be a particular value, numerical or non-numerical, that characterizes the subject. In some implementations, the parameter value may include a unit of measure. In some implementations, the parameter value may not be related to a unit of measure. In some implementations, the unit of measure may be implied and predetermined given the parameter. A given note may be populated with the parameter and placeholder based on the parameter class upon selection of the note type that includes the parameter class. In some implementations, some or all of the individual parameter classes may include the individual parameters and individual corresponding default parameter values. Thus, the parameters and corresponding default parameter values may be populated in the note in response to selection of a note type that includes default parameter values. In some implementations, the default parameter values may remain in the note or the user may modify such default parameter values via the audio information.

The parameter value(s) populated for the parameter may record individual assessments and/or measurements of the parameters taken with respect to the subject such that the parameter values of the parameters define the state of the subject. By way of non-limiting example, the parameters may include height, weight, heart rate, blood pressure, color, and/or other parameters. In some implementations, the one or more parameters may be related to the note section included in. In some implementations, the one or more parameters may be its own note section.

The note may be a digital document that includes information about the subject and their visit or procedure, or otherwise may document the conversation session. The note may be structured or organized into one or more of the note sections based on the selected note type. In some implementations, receiving the selection of the note type may include receiving a spoken selection via the voice commands, or receiving the user input via the user interface elements. In some implementations, receiving the selection of the note type may include determining the note type by analyzing the textualized content blocks obtained from the machine learning model, the content blocks from the machine learning model, and/or other information.

In some implementations, note populating component 114 may be configured to effectuate, via client computing platform 104, presentation of an inquiry that requests specification of one of the note types for the note. In some implementations, the inquiry may be presented responsive to the user input requesting to access the note. In some implementations, the inquiry may be presented responsive to receipt of a termination indication to terminate capturing all the sounds via client computing platform 104. That is, subsequent to concluding the conversation session and the user providing the voice command or the user input via the user interface elements to terminate the capturing of the sounds, the inquiry may be presented to request specification of the one of the note types. In some implementations, the inquiry may be presented and/or the note type may be determined based on a visit request responsive to receipt of the visit request from the first subject to facilitate generating the note prior to the visit. In some implementations, the visit request may include some of the first subject contextual content. For example, the first subject contextual content included in the visit request may include the supplemental audio information that conveys a sound of a cough. In some implementations, generating the prompt for the machine learning model may be based on the note type selected. For example, the prompt may include the note type selected, and thus the one or more sections and/or parameters that are to be included in the note.

In some implementations, note populating component 114 may be configured to receive an indication to populate one or more particular ones of the sections and/or the parameters of the note with the textualized content blocks and/or the content blocks. The indication may include a selection of the particular one or more sections via the user interface of client computing platform 104. In some implementations, the indication to populate may be the particular one or more sections and/or parameters that are presented via client computing platform 104 being used by the caregiver and thus being viewed by the caregiver. In some implementations, the indication may be dictation of the particular one or more sections and/or parameters.

Note populating component 114 may be configured to populate the textualized content blocks and/or the content blocks in the note. In some implementations, populating the textualized content blocks and/or the content blocks in the note may include populating the one or more particular sections and/or parameters indicated or included in the note type selected with the textualized content blocks and/or the content blocks. In some implementations, population of the textualized content blocks and/or the content blocks in the note may be modified, accepted, or denied via the user interface elements.

Figure 3A:
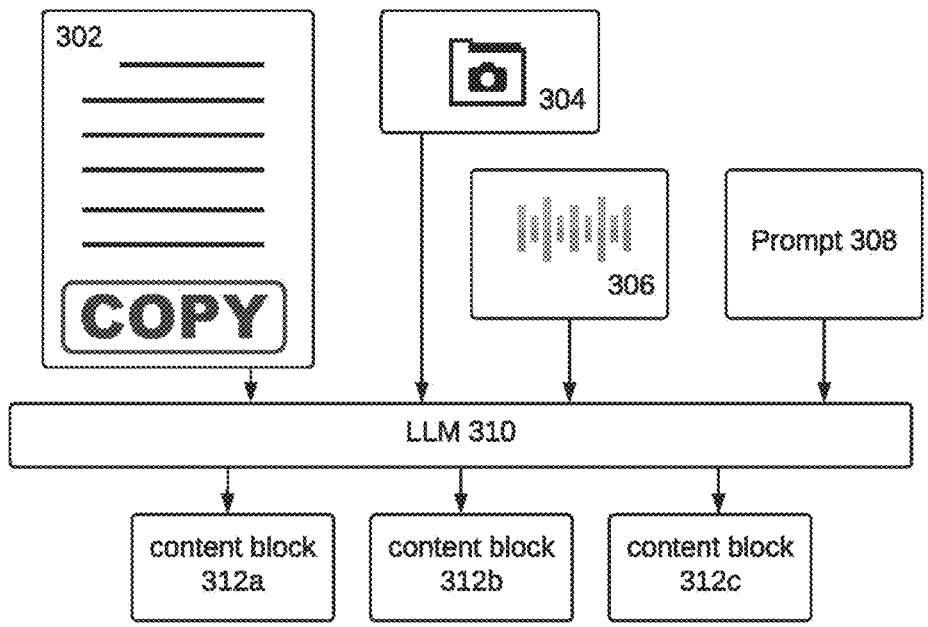
FIG. 3A-B illustrates an example implementation of the system configured to generate notes based on contextual content in multiple modes, in accordance with one or more implementations.
Figure 3B:
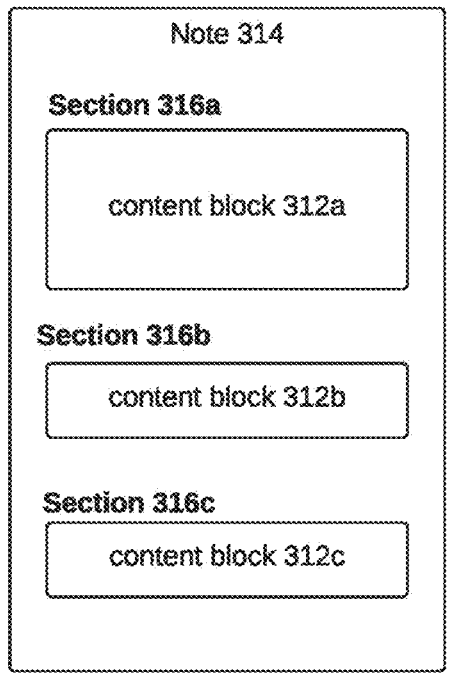

FIG. 3A illustrates a document image 302 conveying credentials of a caregiver (not illustrated), a photo 304 conveying visual symptoms of a subject (not illustrated), audio information 306 conveying a conversation between the caregiver and the subject during a visit, and a prompt 308 that requests generation of content blocks for inclusion in a note 314 illustrated in FIG. 3B. Document image 302, photo 304, information 306, and prompt 308 may be provided to a large language model (LLM) 310 so that LLM 310 may generate content blocks 312*a-c* based on such. Content blocks 312*a-c* may be populated in note 314 in FIG. 3B for the subject under appropriate sections 316*a-c*, respectively. Note 314 may be presented via client computing platform 104 for a caregiver or other care providers to view and/or modify.

Referring back to FIG. 1, in some implementations, server(s) 102, client computing platform(s) 104, and/or external resources 124 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s) 102, client computing platform(s) 104, and/or external resources 124 may be operatively linked via some other communication media.

A given client computing platform 104 may include one or more processors configured to execute computer program components. The computer program components may be configured to enable an expert or user associated with the given client computing platform 104 to interface with system 100 and/or external resources 124, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a gaming console, and/or other computing platforms.

External resources 124 may include sources of information outside of system 100, external entities participating with system 100, and/or other resources. In some implementations, some or all of the functionality attributed herein to external resources 124 may be provided by resources included in system 100.

Server(s) 102 may include electronic storage 126, one or more processors 128, and/or other components. Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 126 may comprise non-transitory storage media that electronically stores information. The electronic storage media of electronic storage 126 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 126 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 126 may include one or more virtual storage resources (e.g., cloud storage, a virtual private network, and/or other virtual storage resources). Electronic storage 126 may store software algorithms, information determined by processor(s) 128, information received from server(s) 102, information received from client computing platform(s) 104, and/or other information that enables server(s) 102 to function as described herein.

Processor(s) 128 may be configured to provide information processing capabilities in server(s) 102. As such, processor(s) 128 may include one or more of a digital processor, an analog processor, a digital circuit designed to process information, an analog circuit designed to process information, a state machine, and/or other mechanisms for electronically processing information. Although processor(s) 128 is shown in FIG. 1 as a single entity, this is for illustrative purposes only. In some implementations, processor(s) 128 may include a plurality of processing units. These processing units may be physically located within the same device, or processor(s) 128 may represent processing functionality of a plurality of devices operating in coordination. Processor(s) 128 may be configured to execute components 108, 110, 112, and/or 114, and/or other components. Processor(s) 128 may be configured to execute components 108, 110, 112, and/or 114, and/or other components by software; hardware; firmware; some combination of software, hardware, and/or firmware; and/or other mechanisms for configuring processing capabilities on processor(s) 128. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 108, 110, 112, and/or 114 are illustrated in FIG. 1 as being implemented within a single processing unit, in implementations in which processor(s) 128 includes multiple processing units, one or more of components 108, 110, 112, and/or 114 may be implemented remotely from the other components. The description of the functionality provided by the different components 108, 110, 112, and/or 114 described below is for illustrative purposes, and is not intended to be limiting, as any of components 108, 110, 112, and/or 114 may provide more or less functionality than is described. For example, one or more of components 108, 110, 112, and/or 114 may be eliminated, and some or all of its functionality may be provided by other ones of components 108, 110, 112, and/or 114. As another example, processor(s) 128 may be configured to execute one or more additional components that may perform some or all of the functionality attributed below to one of components 108, 110, 112, and/or 114.

Figure 2:
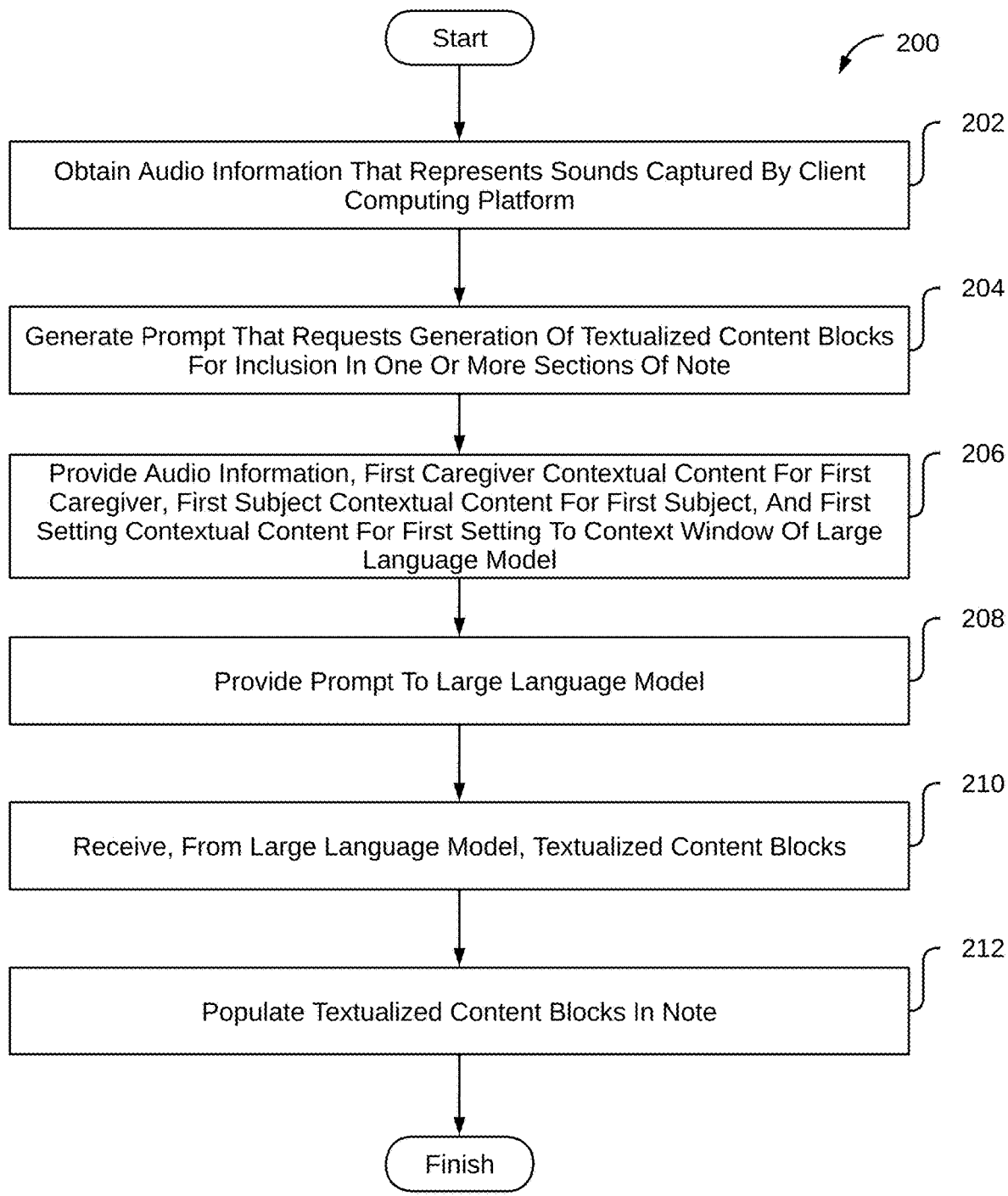
FIG. 2 illustrates a method to generate notes based on contextual content in multiple modes, in accordance with one or more implementations.

FIG. 2 illustrates a method 200 to generate notes based on contextual content, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

An operation 202 may include obtaining audio information that represents sounds captured by a client computing platform. The sounds convey utterances by participants during a conversation session. The participants may include at least a first caregiver and a first subject in a first setting. Operation 202 may be performed by one or more hardware processors configured by machine-readable instructions including a component that is the same as or similar to information obtaining component 108, in accordance with one or more implementations.

An operation 204 may include generating a prompt that requests generation of textualized content blocks for inclusion in one or more sections of a note. The textualized content blocks may include textualized statements of information about the subject. Operation 204 may be performed by one or more hardware processors configured by machine-readable instructions including a component that is the same as or similar to prompt generating component 110, in accordance with one or more implementations.

An operation 206 may include providing the audio information, first caregiver contextual content for the first caregiver, first subject contextual content for the subject, and first setting contextual content for the first setting to a context window of a large language model. Operation 206 may be performed by one or more hardware processors configured by machine-readable instructions including a component that is the same as or similar to model utilizing component 112, in accordance with one or more implementations.

An operation 208 may include providing the prompt to the large language model. Operation 208 may be performed by one or more hardware processors configured by machine-readable instructions including a component that is the same as or similar to model utilizing component 112, in accordance with one or more implementations.

An operation 210 may include receiving, from the large language model, the textualized content blocks. Operation 210 may be performed by one or more hardware processors configured by machine-readable instructions including a component that is the same as or similar to model utilizing component 112, in accordance with one or more implementations.

An operation 212 may include populating the textualized content blocks in the note. Operation 212 may be performed by one or more hardware processors configured by machine-readable instructions including a component that is the same as or similar to note populating component 114, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured to generate notes based on contextual content, the system comprising:
   electronic storage that stores contextual content, wherein the contextual content includes caregiver contextual content for individual caregivers, subject contextual content for individual subjects, and setting contextual content for individual settings, wherein the contextual content includes first caregiver contextual content for a first caregiver, first subject contextual content for a first subject, and first setting contextual content for a first setting; and
   one or more processors configured by machine-readable instructions to:
      obtain audio information that represents sounds captured by a client computing platform, wherein the sounds convey utterances by participants during a conversation session, wherein the participants include at least the first caregiver and the first subject in the first setting;
      generate a prompt that requests generation of textualized content blocks for inclusion in one or more sections of a note, wherein the textualized content blocks include textualized statements of information about the first subject;
      provide the audio information, the first caregiver contextual content, the first subject contextual content, and the first setting contextual content to a context window of a large language model;
      provide the prompt to the large language model;
      receive, from the large language model, the textualized content blocks; and
      populate the textualized content blocks in the note.

2. The system of claim 1, wherein the contextual content provides an understanding of the individual subjects, the individual caregivers, and/or the individual settings to enable provision of efficient care and documentation of the care in the note, wherein the contextual content includes one or more of an image, a video, supplemental audio information, written text, or input text.

3. The system of claim 1, wherein the caregiver contextual content for the individual caregivers includes content indicating an academic transcript, content indicating an accolade list, content indicating training and work experience, and/or content indicating one or more certifications.

4. The system of claim 3, wherein the content included in the caregiver contextual content includes at least one image.

5. The system of claim 1, wherein the subject contextual content for the individual subjects includes content indicating one or more symptoms, a vaccination record, a medication list, a subject history, and/or current body measurement information.

6. The system of claim 5, wherein the content included in the subject contextual content includes one or more images and/or one or more videos, wherein the medication list includes prescriptions and over-the-counter medications, wherein the subject history includes past occurrences of the one or more symptoms and/or familial history of the one or more symptoms, wherein the body measurement information includes blood pressure, body temperature, weight, height, heart rate, and/or blood oxygen saturation.

7. The system of claim 1, wherein the setting contextual content for the individual settings includes content indicating a first physical location of the first subject, a second physical location of the first caregiver, first environmental conditions at the first physical location of the first subject, second environmental conditions at the second physical location of the first caregiver, outbreaks, and/or exposures to illnesses, wherein the first location is indicated by one or more of a street, city, state, province, country, or global positioning system coordinates, wherein the first environmental conditions include one or more of a pollen level, a mold level, a dust and dander level, an air quality level, humidity, outdoor temperature, or indoor temperature.

8. The system of claim 7, wherein the first physical location of the first subject is a medical facility, wherein the setting contextual content includes devices, machines, and/or medications accessible at the medical facility.

9. The system of claim 1, wherein the one or more processors are further configured by the machine-readable instructions to:
receive, via the client computing platform, a selection of a note type from note types stored in the electronic storage, wherein generating the prompt is based on the note type.

10. The system of claim 9, wherein the one or more processors are further configured by the machine-readable instructions to:
receive an indication to populate one or more particular sections and/or parameters of the note with the textualized content blocks,
wherein populating the textualized content blocks in the note includes populating the one or more particular sections with the textualized content blocks.

11. A method to generate notes based on contextual content, the method comprising:
obtaining audio information that represents sounds captured by a client computing platform, wherein the sounds convey utterances by participants during a conversation session, wherein the participants include at least a first caregiver and a first subject in a first setting;
generating a prompt that requests generation of textualized content blocks for inclusion in one or more sections of a note, wherein the textualized content blocks include textualized statements of information about the first subject;
providing the audio information, first caregiver contextual content, first subject contextual content, and first setting contextual content to a context window of a large language model, wherein electronic storage stores contextual content, wherein the contextual content includes caregiver contextual content for individual caregivers, subject contextual content for individual subjects, and setting contextual content for individual settings, wherein the contextual content includes the first caregiver contextual content for the first caregiver, the first subject contextual content for the first subject, and the first setting contextual content for the first setting;
providing the prompt to the large language model;
receiving, from the large language model, the textualized content blocks; and
populating the textualized content blocks in the note.

12. The method of claim 11, wherein the contextual content provides an understanding of the individual subjects, the individual caregivers, and/or the individual settings to enable provision of efficient care and documentation of the care in the note, wherein the contextual content includes one or more of an image, a video, supplemental audio information, written text, or input text.

13. The method of claim 11, wherein the caregiver contextual content for the individual caregivers includes content indicating an academic transcript, content indicating an accolade list, content indicating training and work experience, and/or content indicating one or more certifications.

14. The method of claim 13, wherein the content included in the caregiver contextual content includes at least one image.

15. The method of claim 11, wherein the subject contextual content for the individual subjects includes content indicating one or more symptoms, a vaccination record, a medication list, a subject history, and/or current body measurement information.

16. The method of claim 15, wherein the content included in the subject contextual content includes one or more images and/or one or more videos, wherein the medication list includes prescriptions and over-the-counter medications, wherein the subject history includes past occurrences of the one or more symptoms and/or familial history of the one or more symptoms, wherein the body measurement information includes blood pressure, body temperature, weight, height, heart rate, and/or blood oxygen saturation.

17. The method of claim 11, wherein the setting contextual content for the individual settings includes content indicating a first physical location of the first subject, a second physical location of the first caregiver, first environmental conditions at the first physical location of the first subject, second environmental conditions at the second physical location of the first caregiver, outbreaks, and/or exposures to illnesses, wherein the first location is indicated by one or more of a street, city, state, province, country, or global positioning system coordinates, wherein the first environmental conditions include one or more of a pollen level, a mold level, a dust and dander level, an air quality level, humidity, outdoor temperature, or indoor temperature.

18. The method of claim 17, wherein the first physical location of the first subject is a medical facility, wherein the setting contextual content includes devices, machines, and/or medications accessible at the medical facility.

19. The method of claim 11, further comprising:
receiving, via the client computing platform, a selection of a note type from note types stored in the electronic storage, wherein the generating the prompt is based on the note type.

20. The method of claim 19, further comprising:
receiving an indication to populate one or more particular sections and/or parameters of the note with the textualized content blocks, wherein populating the textualized content blocks in the note includes populating the one or more particular sections with the textualized content blocks.

* * * * *